United States Patent
Hsu (10) Patent No.: US 10,331,246 B2
(45) Date of Patent: Jun. 25, 2019

(54) ULTRA-FINE COPPER MESH FOR DISPLAY AND TOUCH PANEL AND METHOD OF MANUFACTURING THE SAME

(71) Applicant: Ming-An Hsu, Miaoli County (TW)

(72) Inventor: Ming-An Hsu, Miaoli County (TW)

(*) Notice: Subject to any disclaimer, the term of this patent is extended or adjusted under 35 U.S.C. 154(b) by 0 days.

(21) Appl. No.: 15/605,651

(22) Filed: May 25, 2017

(65) Prior Publication Data

US 2017/0351352 A1 Dec. 7, 2017

(30) Foreign Application Priority Data

Jun. 7, 2016 (TW) .............................. 105117996 A (51) Int. Cl.
  *H01L 41/332* (2013.01)
  *G06F 3/041* (2006.01)
  *G02F 1/1333* (2006.01)

(52) U.S. Cl.
  CPC .......... *G06F 3/041* (2013.01); *G02F 1/13338* (2013.01); *G06F 2203/04103* (2013.01); *G06F 2203/04112* (2013.01)

(58) Field of Classification Search
  CPC ........... G06F 3/041; G06F 2203/04112; G02F 1/13338; H01L 21/165
  USPC .......................... 216/13, 16, 75, 76, 78, 105
  See application file for complete search history.

(56) References Cited

U.S. PATENT DOCUMENTS

| 3,662,105 A | 5/1972 | Hurst et al. |
| 2012/0318585 A1* | 12/2012 | Kim .......................... H05K 3/06 178/18.03 |
| 2015/0362728 A1* | 12/2015 | Tei ....................... G02B 5/3033 353/20 |
| 2016/0201016 A1* | 7/2016 | Ivanov ................ C11D 11/0047 510/175 |

* cited by examiner

*Primary Examiner* — Binh X Tran
(74) *Attorney, Agent, or Firm* — Muncy, Geissler, Olds & Lowe, P.C.

(57) ABSTRACT

The disclosure provides an ultra-fine copper mesh for a display and a touch panel, comprising a transparent substrate, having an upper surface and a lower surface with respect to the upper surface; and a first copper electrode layer comprising a first pure copper deposited film, having a top surface and a bottom surface with respect to the top surface, wherein the bottom surface of the first pure copper deposited film is disposed on the upper surface of the transparent substrate; and a first antireflective conductive film, disposed on the top surface of the first pure copper deposited film, the first antireflective conductive film comprises a cuprous oxide ($Cu_2O$). After the first antireflective conductive film is subjected to an exposure developing process, the first copper deposited film layer of the first copper electrode layer and the first antireflective conductive film are simultaneously subjected to an over-etching process on the transparent substrate to form together at least one mesh pattern.

4 Claims, 6 Drawing Sheets

ULTRA-FINE COPPER MESH FOR DISPLAY AND TOUCH PANEL AND METHOD OF MANUFACTURING THE SAME

BACKGROUND

Technical Field

The disclosure relates to a copper mesh, in particularly, an ultra-fine copper mesh which is capable of applying both high light transmission and low reflection characteristics and is applicable to the field of a display and a touch panel.

Description of the Related Art

In the 1960s, Heilmeier, of Radio Corporation of America Corporation (RCA), developed a liquid crystal display, which pioneered a new era of digital display. Since the liquid crystal display (LCD) has many advantages such light, portable, low power, many kinds of digital electronic products are booming by mass production. In the 1970s, people developed a touch-sensitive technique that allows people to enter specific information by pressing the location. Refer to the U.S. Pat. No. 3,662,105, titled as "Electrical sensor of plane coordinates", it discloses by cross-arranging the two electric fields with the direction perpendicular to each other, the position of the touch behavior is recognized by the signal difference of the staggered position at the time of touch sensing to achieve the effect of touching. With the display and touch technology advances, it was found that the thin and light characteristics of liquid crystal display can combine with the touch technology. Especially, in 1994, the IBM (International Business Machines Corporation) published a mobile phone with a touch screen, and further promoted the LCD display with the touch technology to development of n a variety of portable electronic products.

However, for the touch display screen of the prior art, the display module (LCM) or touch panel (TP) used un-transparent electrode and affected the aperture ratio (AR) of the overall transparent light. Thus, it is difficult to reduce the power of the illuminance. Moreover, the width of the electrode is related to the resolution of the lithography of the semiconductor manufacturing, and the smaller width of the electrode requires the higher resolution of the exposure light source and the mode, and thus the higher the production equipment and the cost. The more difference between the resolutions would cause the higher the level of the cost, and therefore the touch-screen display industry must take a balance between the aperture ratio and manufacturing costs. On the other hand, the material of the electrode is generally made of a metallic material which has a considerable degree of reflectivity for natural light. Especially when its wire diameter is not small enough and/or used at a large angle, using of the touch display screen suffers from the reflection of the un-transparent electrode and thus affects the comfort of the viewing and touch operation.

Therefore, it is the urgent need to provide an ultra-fine copper mesh to solve the technical problems, The proposed ultra-fine copper mesh is obtained in a low-cost manufacturing method with the same width using the high-cost production quality, and has a function of preventing reflection of natural light in the human eye.

BRIEF SUMMARY OF THE INVENTION

In view of the shortcomings of the prior art described above, the main object of the disclosure is to provide an ultra-fine copper mesh for a display and a touch panel and a method for manufacturing the same, which is obtained in a low-cost manufacturing method with the same width using the high-cost production quality, and has a function of preventing reflection of natural light in the human eye, thus to achieve both low cost and high production quality, and enhance the use of comfort purposes.

In order to achieve the foregoing and other objects, a ultra-fine copper mesh of a display and a touch panel of the disclosure, comprising: a transparent substrate, having an upper surface and a lower surface with respect to the upper surface; and a first copper electrode layer, comprising: a first pure copper deposited film, having a top surface and a bottom surface with respect to the top surface, wherein the bottom surface of the first pure copper deposited film is disposed on the upper surface of the transparent substrate; an a first antireflective conductive film, disposed on the top surface of the first pure copper deposited film, wherein the first antireflective conductive film comprises a cuprous oxide ($Cu_2O$); wherein after the first antireflective conductive film is subjected to an exposure developing process, the first copper deposited film layer of the first copper electrode layer and the first antireflective conductive film are simultaneously subjected to an over-etching process on the transparent substrate to form together at least one mesh pattern.

Preferably, the first antireflective conductive film is formed by using a surface treatment to remove a substance other than cuprous oxide in an oxide layer formed on the surface of the first pure copper deposited film layer.

Preferably, the first copper electrode layer comprises a copper oxide composite film, the copper oxide composite film comprising a copper oxide and a cuprous oxide and disposed between the bottom surface of the first pure copper deposited film layer and the upper surface of the transparent substrate, and the copper oxide composite film, the first pure copper deposited film and the first antireflective conductive film form the mesh pattern together on the transparent substrate by using the etching process simultaneously.

Preferably, the second copper electrode layer comprising a second copper deposited film layer and a second antireflective conductive film, wherein the second pure copper deposited film has a top surface and a bottom surface with respect to the top surface, the bottom surface of the second pure copper deposited film is disposed on the lower surface of the transparent substrate; the second antireflective conductive film is disposed on the top surface of the second pure copper deposited film and comprises a cuprous oxide, and is electrically connected to the second pure copper deposited film, wherein the first pure copper deposited film of the first copper electrode layer, the first antireflective conductive film, the second copper deposited film layer of the second copper electrode layer, and the second antireflective conductive film form the mesh pattern together on the transparent substrate by using the etching process simultaneously.

Preferably, the transparent substrate comprises one of the glass, polyethylene terephthalate (PET), polycarbonate (PC), polymethylmethacrylate (PMMA), sapphire, tri-cellulose acetate (TCA), cyclo olefin copolymer (COC), polyimine (PI).

Preferably, a mesh width of at least one of the mesh pattern is between 0.5 micron and 20 microns.

In order to achieve the foregoing and other objects, a method of manufacturing an ultra-fine copper mesh of a display and a touch panel, comprising the steps of: a pure copper depositing step of depositing a pure copper deposited film on a transparent substrate; a pure copper oxidation step of forming an oxide layer on the surface of the pure copper deposited film layer; a surface treatment step of removing a substance other than cuprous oxide in the oxide layer to form an antireflective conductive film; an exposure developing step of coating a photoresist (PR) to the antireflective conductive film and developing the photoresist (PR) to form a mesh pattern; an over-etching step of over-etching the pure copper deposited film and the antireflective conductive film to form the mesh pattern on the transparent substrate; and a photoresist (PR) removal step of removing the photoresist (PR) on the antireflective conductive film.

Preferably, in the pure copper deposited film step, the opposite surfaces of the transparent substrate are deposited separately the pure copper deposited film, and both surfaces of the pure copper deposited film are subjected simultaneously to the pure copper oxidation step, the surface treatment step, the exposure development step, the over-etching step, and the photoresist (PR) removal step.

Preferably, further comprising the step of junction oxidizing step of disposing a copper oxide composite film between the pure copper deposited film and the transparent substrates before the pure copper depositing step.

Preferably, the transparent substrate comprises one of glass, polyethylene terephthalate (PET), polycarbonate (PC), polymethylmethacrylate (PMMA), sapphire, tri-cellulose Acetate (TCA), cyclo olefin copolymer (COC), polyimide (PI).

The first copper electrode layer 30 of the ultra-fine copper mesh of the disclosure is formed on the transparent substrate 20 by an over-etching process. The over-etching process in the over-etching step (step S5 and step S5') results in a thinner line width and thinner line thickness compared to those in the exposure development step (step S4 and step S4'), and does not limited the feature size of the mask in the exposure development process. For example, an exposure development process with a feature size of 5 microns is used, and the feature size of 3 microns for the line width of the mesh can be achieved by the over-etching process. Therefore, it is possible to obtain the same production quality as the high-cost exposure development process using an inexpensive exposure development process. On the other hand, since the first antireflective conductive film is disposed on the top surface of the first pure copper deposited film and has a function of preventing reflection of natural light in the human eye. Therefore, the ultra-fine copper mesh of the disclosure can be applied to the display and touch panel to achieve the same production quality of high cost by using a low cost process and reduce the reflection in use and enhance the purposes of comfort use.

BRIEF DESCRIPTION OF THE DRAWINGS

All the objects, advantages, and novel features of the invention will become more apparent from the following detailed descriptions when taken in conjunction with the accompanying drawings.

DETAILED DESCRIPTION

Hereinafter, the embodiments of the disclosure will be described by way of specific embodiments, and other advantages and effects of the disclosure will become apparent to those skilled in the art from the disclosure of this specification. The disclosure may also be embodied or modified by other specific examples, and the details in the specification of the disclosure may be modified and modified in various ways without departing from the spirit of the invention.

The structure, proportions, and sizes of the drawings shown in the drawings are intended to be used in conjunction with the disclosure of the specification for the benefit of those skilled in the art and are not intended to limit the scope of the invention The modification of the structure, the change of the proportion or the adjustment of the size of the structure, without affecting the effectiveness of the invention and the achieved purpose, should fall on the scope of the invention intended by the technical content disclosed in the invention.

Hereinafter, an ultrafine copper mesh of a display and a touch panel will be described in accordance with an embodiment of the disclosure.

Figure 1:
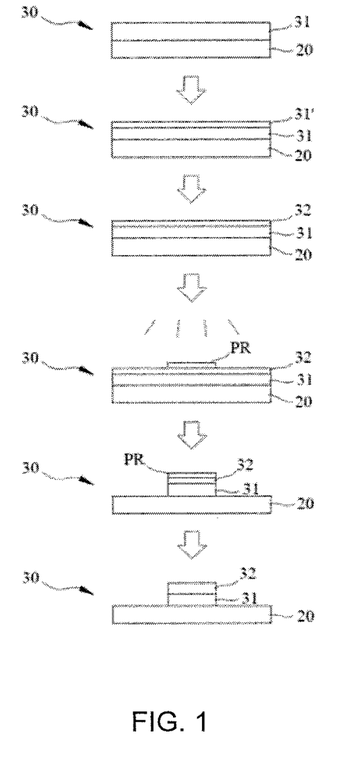
FIG. 1 and FIG. 2 show a schematic diagram of a manufacturing process of an ultra-fine copper mesh according to a first embodiment of an ultra-fine copper mesh for a display and a touch panel according to the disclosure.
Figure 2:
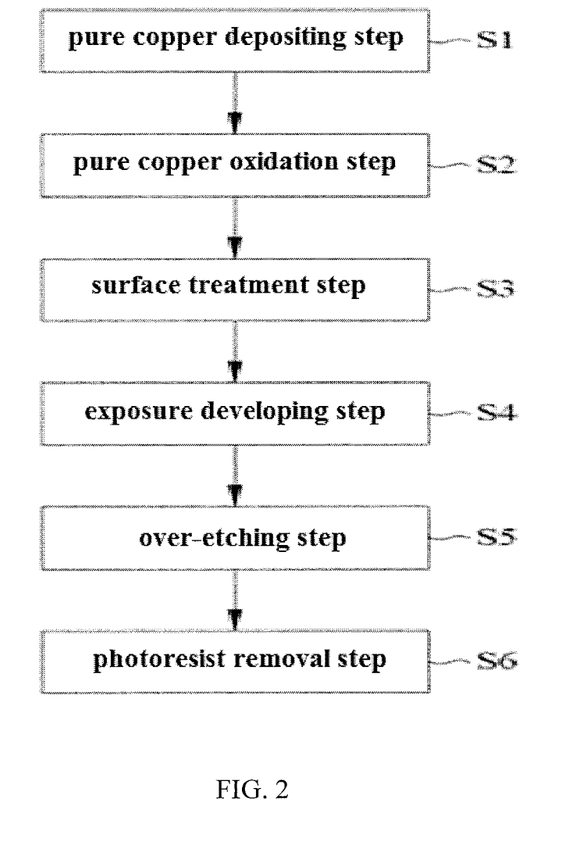

Referring to FIGS. 1 to 2, a first embodiment of an ultra-fine copper mesh for a display and a touch panel of the disclosure comprises a transparent substrate 20 and a first copper electrode layer 30. Wherein, the transparent substrate 20 has an upper surface and a lower surface with respect to the upper surface. According to the first embodiment of the disclosure, the transparent substrate 20 is one of the group comprising glass, polyethylene terephthalate (PET), polycarbonate (PC), polymymethylmethacrylate (PMMA), sapphire, tri-cellulose Acetate (TCA), cyclo olefin copolymer (COC) and polyimide (PI), which is provided for maintaining the mechanical strength and its light transmission of the ultra-fine copper mesh, applied to the display and touch panel.

The first copper electrode layer 30 comprises a first copper deposited film 31 and a first antireflective conductive film 32. Wherein, the first pure copper deposited film 31 has a top surface and a bottom surface with respect to the top surface, and the bottom surface of the pure copper deposited film 31 is disposed on the upper surface of the transparent substrate 20. According to the first embodiment of the disclosure, the first pure copper deposited film 31 is deposited on the transparent substrate 20 by using one of the evaporation method (such as crucible evaporation, ion beam evaporation, laser evaporation, etc.) and sputtering method (such as ion beam sputtering, and magnetical sputtering, etc.) to form a copper based metal mesh (copper mesh) after etching. In addition, the copper mesh can also be formed by sputtering a layer of copper seed and then plating. In other words, a variety of processes of pure copper thin film can be used for the copper mesh.

The first antireflective conductive film 32 is disposed on the top surface of the first pure copper deposited film 31, wherein the first antireflective conductive film 32 includes cuprous oxide ($Cu_2O$) and is electrically connected to the first pure copper deposited film 31. According to the first embodiment of the disclosure, the first antireflective conductive film 32 is formed by forming an oxide layer 31' on the surface of the first pure copper deposited film 31 and removing a substance other than the cuprous oxide in the oxide layer 31' by using a surface treatment. In the general atmospheric environment, the surface of the pure copper (Cu) encountered oxygen (O2) will be oxidized to be many types of copper-oxide compounds, such as copper oxide (CuO), cuprous oxide ($Cu_2O$), copper peroxide ($CuO_2$). In which, copper oxide (CuO) and cuprous oxide ($Cu_2O$) are the most typical types. In the general atmospheric environment, pure copper (Cu) encountered oxygen ($O_2$) will be oxidized first to be reddish brown and conductive cuprous oxide ($Cu_2O$), where the copper in this molecule is monovalent copper ($Cu^{+1}$). The cuprous oxide ($Cu_2O$), continues to be in a wet and oxygen-containing environment, would slowly change to be black and not conductive copper oxide (CuO), where the copper in the molecule is divalent copper ($Cu^{+2}$). Whether the reflectivity to natural light of the black copper oxide (CuO) and the reddish brown cuprous oxide ($Cu_2O$) is lower than that of the surface of the first pure copper deposited film 31, therefore the copper oxide (CuO) and the cuprous oxide ($Cu_2O$) have an effect of antireflection. However, in the case where copper oxide (CuO) and cuprous oxide ($Cu_2O$) are mixed at the same time, the electrical conductivity of the antireflective conductive film is affected. Therefore, in the first embodiment of the disclosure, by using the surface treatment as described above, (CuO) which is not electrically conductive in the surface oxide layer 31' of the first pure copper deposited film 31 is selectively removed and the conductive cuprous oxide ($Cu_2O$) having conductivity is retained to guarantee the first antireflective conductive film 32 with a better conductivity.

The first embodiment of the disclosure comprises the following steps: a pure copper depositing step (step S1) of depositing a pure copper deposited film 31 on a transparent substrate 20; a pure copper oxidation step (step S2) of forming an oxide layer on the surface of the pure copper deposited film 31; a surface treatment step (step S3) of removing a substance other than cuprous oxide in the oxide layer to form an antireflective conductive film 32; an exposure developing step (step S4) of coating a photoresist (PR) to the antireflective conductive film 32 and developing the photoresist (PR) to form a mesh pattern; an over-etching step (step S5) of over-etching the pure copper deposited film 31 and the antireflective conductive film 32 to form the mesh pattern on the transparent substrate 20; and a photoresist (PR) removal step (step S6) of removing the photoresist (PR) on the antireflective conductive film.

Figure 3:
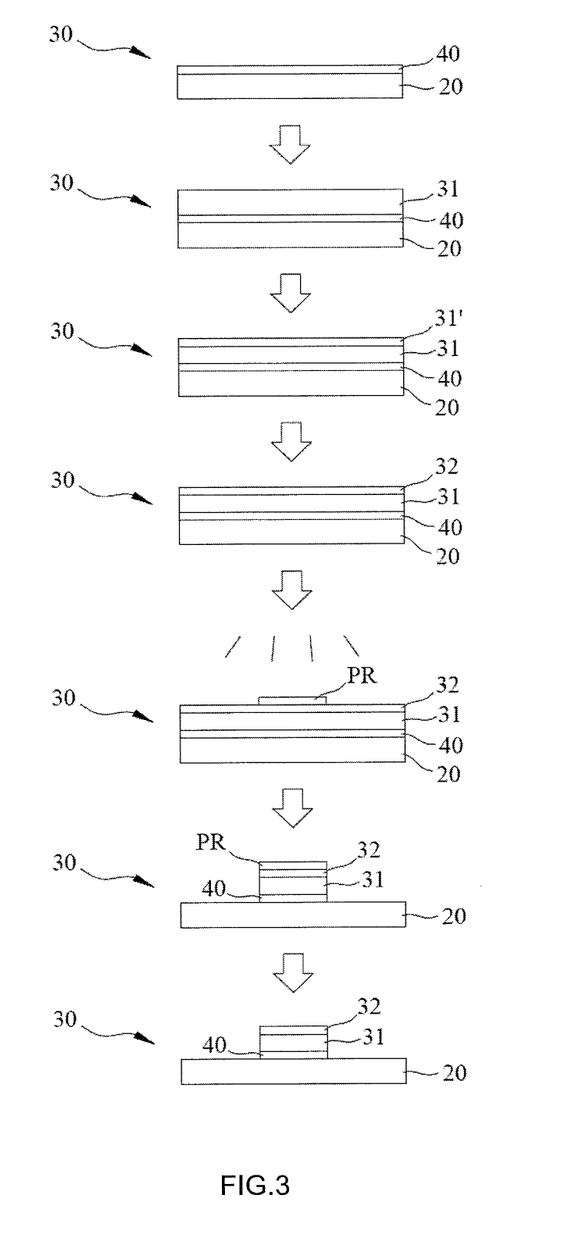
FIG. 3 and FIG. 4 show a schematic representation of a manufacturing process of an ultra-fine copper mesh according to a second embodiment of an ultra-fine copper mesh for a display and a touch panel according to the invention.
Figure 4:
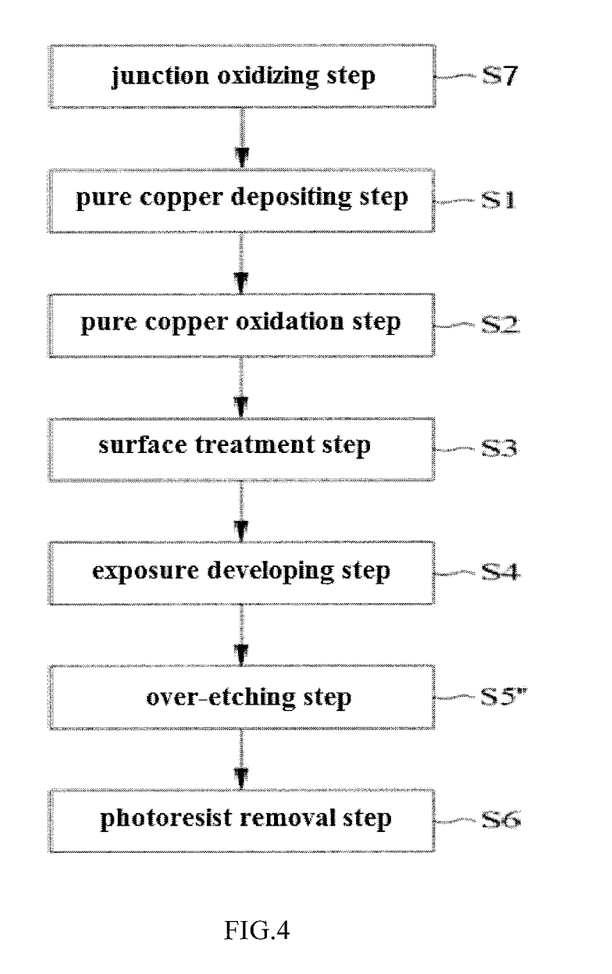

Referring to FIGS. 3 to 4, a second embodiment of the ultra-fine copper mesh for a display and a touch panel of the disclosure is substantially the same as that of the first embodiment described above. This second embodiment further comprises a step of junction oxidizing step (step S7) of disposing a copper oxide composite film 40 between the pure copper deposited film 31 and the transparent substrate 20 before earring out the pure copper depositing step. According to the second embodiment of the disclosure, the copper oxide composite film 40 includes copper oxide (CuO) and cuprous oxide ($Cu_2O$), and is disposed between the bottom surface of the first pure copper deposited film 31 and the upper surface of the transparent substrate 20. And the copper oxide composite film 40, the first pure copper plated film 31 and the first antireflective conductive film 32 form the mesh pattern (step S5') together on the transparent substrate by using the etching process of over-etching step simultaneously. In the second embodiment of the disclosure, the copper oxide composite film 40 is formed by composing of an oxygen plasma of oxygen ($O_2$) and/or a high-frequency oxygen plasma when evaporating or sputtering of pure copper (Cu).

Figure 5:
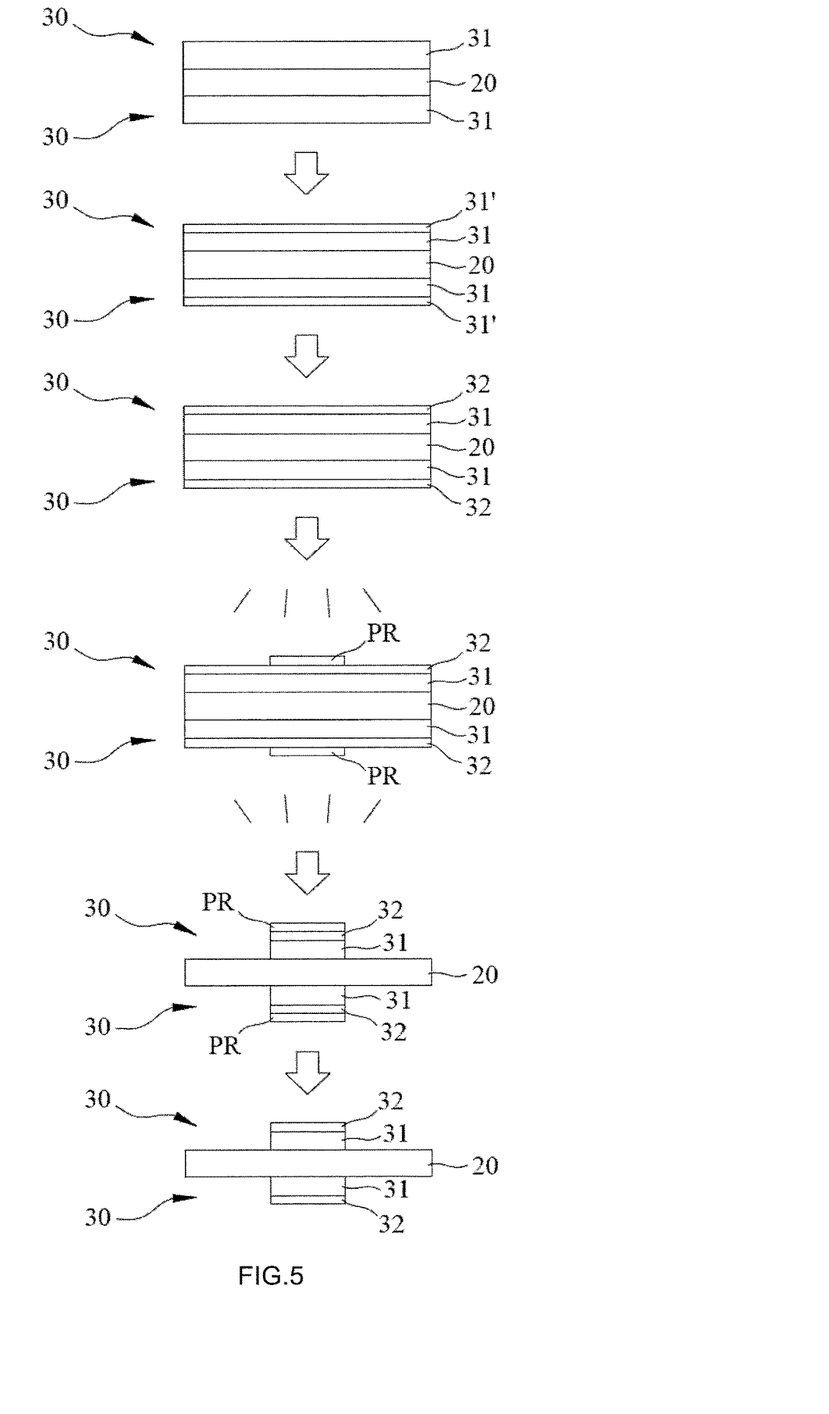
FIGS. 5 and 6 show a schematic flow of a manufacturing process of an ultra-fine copper mesh according to a third embodiment of the ultra-fine copper mesh for a display and a touch panel of according to the disclosure.
Figure 6:
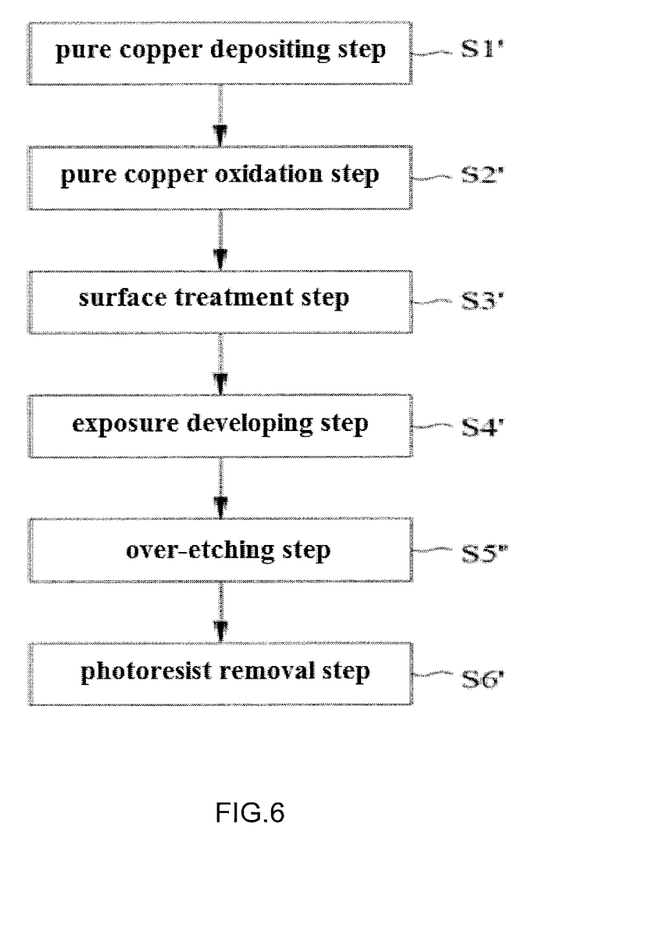

Referring to FIGS. 5 to 6, a third embodiment of the ultra-fine copper mesh for a display and a touch panel of the disclosure is substantially the same as the first embodiment described above. This difference is in the step S1. In step S1, the first pure copper deposited film 31 is deposited simultaneously on the upper and lower surfaces of the transparent substrate 20 ((step S1')), and the upper and lower surfaces of the first pure copper deposited film 31 are subjected simultaneously to the pure copper oxidation step (step S2'), the surface treatment step (step S3'), the exposure development step (step S4'), the over-etching step (step S5'), and the photoresist (PR) removal step (step S6'), and finally the opposite two sides of the transparent substrate 20 are both formed a mesh pattern, and once constitute two metal meshes.

The first copper electrode layer 30 of the ultra-fine copper mesh of the disclosure is formed on the transparent substrate 20 by an over-etching process. The over-etching process in the over-etching step (step S5 and step S5') results in a thinner line width and thinner line thickness compared to those in the exposure development step (step S4 and step S4'), and does not limited the feature size of the mask in the exposure development process. For example, an exposure development process with a feature size of 5 microns is used, and the feature size of 3 microns for the line width of the mesh can be achieved by the over-etching process. Therefore, it is possible to obtain the same production quality as the high-cost exposure development process using an inexpensive exposure development process. On the other hand, since the first antireflective conductive film 32 is disposed on the top surface of the first pure copper deposited film 31 and has a function of preventing reflection of natural light in the human eye. Therefore, the ultra-fine copper mesh of the disclosure can be applied to the display and touch panel to achieve the same production quality of high cost by using a low cost process and reduce the reflection in use and enhance the purposes of comfort use. In summary, the line width of the ultra-fine copper mesh of the disclosure is between 0.5 microns and 20 microns.

While the embodiments have been described with reference to a number of illustrative embodiments of the present application, it will be understood by those skilled in the art that various other changes and embodiments can be envisioned which will fall within the principles of this disclosure spirit and scope. In particular, various changes and modifications may be made to the components and/or arrangements of the subject matter in connection with the scope of the present disclosure, the drawings, and the scope of the appended claims. Alternative uses will be apparent to those skilled in the art in addition to variations and modifications in the components and/or arrangements.

What is claimed is:

1. A method of manufacturing an ultra-fine copper mesh of a display and a touch panel, comprising the steps of:
    a pure copper depositing step of depositing a pure copper deposited film on a transparent substrate;
    a pure copper oxidation step of forming an oxide layer on the surface of the pure copper deposited film layer, the oxide layer comprising cuprous oxide ($Cu_2O$) and copper oxide (CuO);
    a surface treatment step of removing copper oxide (CuO) in the oxide layer to form an antireflective conductive film containing only cuprous oxide ($Cu_2O$);
    an exposure developing step of coating a photoresist (PR) to the antireflective conductive film and developing the photoresist (PR) to form a mesh pattern;
    an over-etching step of over-etching the pure copper deposited film and the antireflective conductive film to form an ultra-fine copper mesh on the transparent substrate; and
    a photoresist (PR) removal step of removing the photoresist (PR) on the antireflective conductive film,
    wherein a mesh width of at least one of the ultra-fine copper mesh is between 0.5 micron and 20 microns.

2. A method of manufacturing an ultra-fine copper mesh of a display and a touch panel as claimed in claim 1, wherein in the pure copper deposited film step, the opposite surfaces of the transparent substrate are deposited separately the pure copper deposited film, and both surfaces of the pure copper deposited film are subjected simultaneously to the pure copper oxidation step, the surface treatment step, the exposure development step, the over-etching step, and the photoresist (PR) removal step.

3. A method of manufacturing an ultra-fine copper mesh of a display and a touch panel as claimed in claim 1, further comprising the step of junction oxidizing step of disposing a copper oxide composite film between the pure copper deposited film and the transparent substrate before the pure copper depositing step.

4. A method for producing an ultra-fine copper mesh of a display and a touch panel as claimed in claim 1, wherein the transparent substrate comprises one of glass, polyethylene terephthalate (PET), polycarbonate (PC), polymethylmethacrylate (PMMA), sapphire, tri-cellulose Acetate (TCA), cyclo olefin copolymer (COC), polyimide (PI).

* * * * *